United States Patent
Shen et al.

(10) Patent No.: US 8,154,960 B2
(45) Date of Patent: Apr. 10, 2012

(54) POWER SAVING METHOD AND SYSTEM APPLIED IN OPTICAL DISK DRIVE

(75) Inventors: Yung-chi Shen, Taipei (TW); Shih-jung Chiu, Gangkou Village Anding Township (TW); Wei-hsin Hsu, Sijhih (TW); Kuo-jung Lan, Jhonghe (TW)

(73) Assignee: Mediatek Inc., Hsin-Chu (TW)

( * ) Notice: Subject to any disclaimer, the term of this patent is extended or adjusted under 35 U.S.C. 154(b) by 1031 days.

(21) Appl. No.: 11/555,543

(22) Filed: Nov. 1, 2006

(65) Prior Publication Data

US 2008/0101175 A1    May 1, 2008

(51) Int. Cl.
G11B 7/00    (2006.01)

(52) U.S. Cl. ..................... 369/44.27; 713/324
(58) Field of Classification Search .......... None
See application file for complete search history.

(56) References Cited

U.S. PATENT DOCUMENTS

| | | | |
|---|---|---|---|
| 5,799,199 A | | 8/1998 | Ito et al. |
| 6,269,061 B1 * | | 7/2001 | Shimizume et al. ......... 369/47.3 |
| 6,799,242 B1 | | 9/2004 | Tsuda et al. |
| 2005/0019022 A1 | | 1/2005 | Lee |
| 2005/0204175 A1 * | | 9/2005 | Burton ................... 713/300 |

FOREIGN PATENT DOCUMENTS

EP    0649131 A2    4/1995

* cited by examiner

*Primary Examiner* — Joseph Haley

(57) ABSTRACT

The present invention sets forth a power saving method and a power saving system applied in an optical disk drive. The power saving system comprises a central processing unit, a spindle motor, an optical pick-up unit, an analog portion of control circuits and a digital portion of control circuits. Each of the analog or digital portions of control circuits can be divided into several sets of circuits. Each set of circuits is coupled to an associated operation mode of the optical disk drive. The power saving system further comprises a power controlling unit for differentiating the specific sets of circuits not being used in the specific operation mode and powering them down. The sets of circuits not being used will be powered up while the associated operation mode in which they are required to operate is nearly started. The present invention also provides a power saving method of powering down the sets of circuits not being used relative to a specific operation mode of the optical disk drive.

3 Claims, 10 Drawing Sheets

POWER SAVING METHOD AND SYSTEM APPLIED IN OPTICAL DISK DRIVE

FIELD OF THE INVENTION

The present invention generally relates to a power saving method and a power saving system applied in an optical disk drive, and more particularly, to a power saving method and system for powering down the circuits not being used during the operation of the optical disk drive.

BACKGROUND OF THE INVENTION

As the development of the portable electronic products, the requirements for power saving are more and more critical. For a notebook personal computer (NB, or called laptop PC), each component is required to consume power as less as possible so as to save the power of a battery used in the NB.

Similarly, the optical disk drive used in the notebook PC is also required to diminish its power consumption. Conventional optical disk drive only stops the spindle motor while the optical disk drive is not reading or writing an optical disk to reduce the power consumption. However, the conventional optical disk drive supplies power to all circuits of chip(s) thereof all the time, no matter being used or not.

The operation of the optical disk drive can be divided into several operation modes, and each mode is executed by some specific circuits in a control chip. When the optical disk drive is operated in a specific mode, only some circuits in the control chip are used, the other circuits not used in this mode can be powered down without effecting the normal operation of the optical disk drive.

Accordingly, the circuits not being used in the chip can be powered down for reducing the power consumption of the optical disk drive when the optical dick drive is operated in a specific operation mode. Therefore, the portable electronic product which comprises an optical disk drive can maximally save power by reducing the power consumption of the optical disk drive thereof.

SUMMARY OF THE INVENTION

A primary objective of the present invention is to provide a power saving method applied in an optical disk drive. The power saving method is capable of reducing the power consumption of the optical disk drive by powering down the circuits not being used during the operation of the optical disk drive.

The present invention sets forth a power saving method and a power saving system applied in an optical disk drive. The power saving system comprises a central processing unit, a spindle motor, an optical pick-up unit, an analog portion of control circuits and a digital portion of control circuits. Each of the analog or digital portions of control circuits can be divided into several sets of control circuits. Each set of control circuits is related to an operation mode of the optical disk drive. The power saving system further comprises a power controlling unit for differentiating the sets of control circuits not being used in the specific operation mode and powering them down. Those powered-down sets of control circuits will be powered up when an operation mode in which they are required to operate is nearly started.

The power saving method comprises following steps of:
Step 1 Starting a power control procedure.
Step 2 A power controlling unit receives a command related to a first operation mode. The command may be a Seek command and the first operation mode may be a Seek mode, for example. The operation mode and the corresponding command could be related to a Seek mode, a Following mode, a Long-Seek mode, a Short-Seek mode, a Data-Reading mode or a Data-Writing mode.
Step 3 The power controlling unit issues a power up signal to power up the first set of control circuits related to the first operation mode in order to be ready for starting the first operation mode.
Step 4 The power controlling unit issues a power down signal to power down the first set of rest circuits is not used in the first operation mode.
Step 5 Starting to execute the first operation mode when the first set of circuits powered up.
Step 6 The power controlling unit monitors the schedule of first operation mode. The power control procedure will go forward to the Step 8 if the power controlling unit finds that the first operation mode is nearly finished, otherwise the power controlling unit monitors the schedule of first operation mode continuously.
Step 7 The second set of control circuits related to the second operation mode are powered up by the power controlling unit in order to be ready for starting the second operation mode.
Step 8 The second set of rest circuits are not used in the second operation mode are powered down by the power controlling unit when the first operation mode is finished, and the power control procedure goes back to Step 2.

In Step 4, the time point for powering down the first set of rest circuits not being used in the first operation mode can be determined by delaying a predetermined period from the time point of issuing the power up signal to power up the first set of control circuits related to the first operation mode. Therefore, the first set of rest circuits not being used in the first operation mode are powered down after the predetermined period ends. In other words, the second operation mode is finished before or when the predetermined period ends. The predetermined period can be predetermined according to the length of warm-up time of first set of control circuits related to the first operation mode. Alternatively, the time point for powering down the first set of rest circuits not being used in the first operation mode can be determined when the power controlling unit receives a signal for indicating that the first operation mode is actually started.

The present invention provides the power saving system and method applied in an optical disk drive. The power saving system and method of the present invention are adapted for powering down at least a set of control circuits not being used during a specific operation mode of the optical disk drive without effecting the normal operation of the optical disk drive. Therefore, the power saving system and method according to the present invention are capable of reducing the power consumption of the optical disk drive.

DETAILED DESCRIPTION OF THE PREFERRED EMBODIMENTS

The present invention is directed to a power saving method and a power saving system applied in an optical disk drive. The power saving method and the power saving system in accordance with the present invention are capable of powering down the specific set of control circuits not being used during the operation of the optical disk drive.

Figure 1:
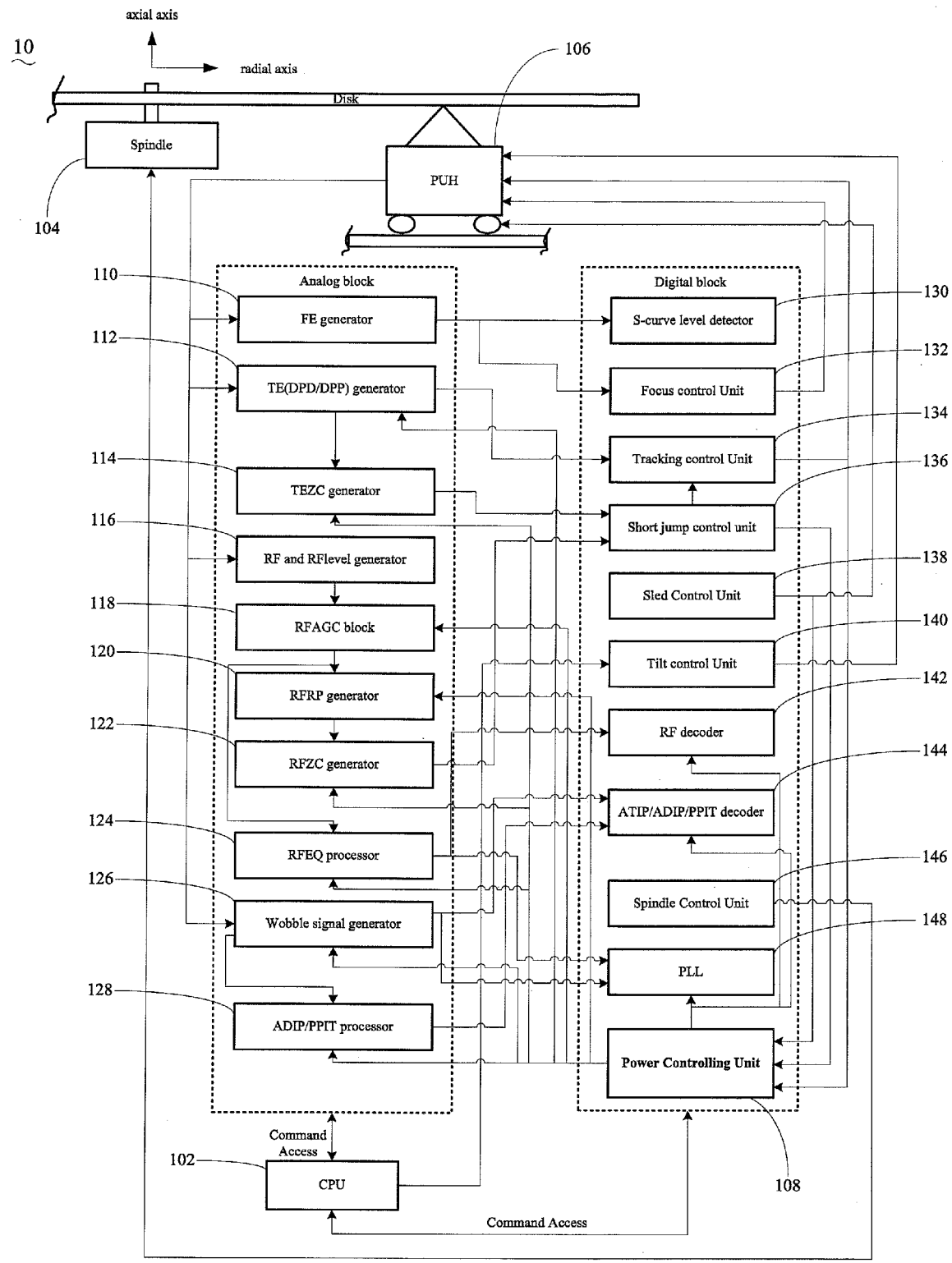
FIG. 1 illustrates a block diagram of a power saving system applied in an optical disk drive according to the present invention.

FIG. 1 illustrates a block diagram of a power saving system applied in an optical disk drive according to the present invention. The power saving system 10 comprises a central processing unit (CPU) 102, a spindle motor (spindle) 104 and an optical pick-up unit (PUH) 106. The power saving system 10 further comprises an analog portion of control circuits and a digital portion of control circuits. The analog portion of control circuits includes several circuits, such as an FE generator 110, a TE(DPD/DPP) generator 112, a TEZC generator 114, an RF and RF level generator 116, an RFAGC block 118, an RFRP generator 120, an RFZC generator 122, an RFEQ processor 124, a wobble signal generator 126 and an ADIP/PPIT processor 128. The digital portion of control circuits includes several circuits, such as a power controlling unit 108, an S-curve level detector 130, a focus control unit 132, a tracking control unit 134, a short jump control unit 136, a sled control unit 138, a tilt control unit 140, an RF decoder 142, an ATIP/ADIP/PPIT decoder 144, a spindle control unit 146 and a phase lock loop (PLL) 148. Please note that, the digital portion and the analog portion mentioned above are just the embodiments of the present invention. The circuits in the analog portion maybe designed as digital circuit and classified into digital portion in other embodiments, and the circuits in the digital portion maybe designed as an analog circuit and classified into analog portion in other embodiments. All kinds of circuit that can be powered up or powered down should be included into the present invention.

As known, an optical disk drive includes several operation modes for executing a completed reading or writing operation. The optical disk drive activates different sets of control circuits in different operation modes. TABLE 1 illustrates the different operation modes of the optical disk drive. The whole operation of an optical disk drive can be mainly divided into two operation modes, e.g. a Seek mode and a Following mode. Furthermore, the Seek mode can be subdivided into two sub-operation modes, e.g. a Sled Follow Lens Kick mode (Short Seek mode) and a Sled Move mode (Long Seek mode). And, the Following mode can be subdivided into two sub-operation modes, e.g. a Data-Reading mode and a Data-Writing mode.

TABLE 1

Operation modes of optical disk drive

| Operation Modes of Optical Disk Drive | | | |
| --- | --- | --- | --- |
| Seek Mode | | Following Mode | |
| Sled Follow Lens Kick (Short Seek) Mode | Sled Move (Long Seek) Mode | Data-Reading Mode | Data-Writing Mode |

In each sub-operation mode, there are corresponding sets of control circuits operate. The sets of control circuits not being used in this sub-operation mode (or operation mode) can be powered down during the period that the sub-operation mode is executed. TABLE 2 illustrates the sets of control circuits not being used in the respective operation modes.

TABLE 2

The sets of control circuits not being used in Seek or Following modes

| | Seek Mode | | Following Mode | |
| --- | --- | --- | --- | --- |
| | Short Seek Mode | Long Seek Mode | Data-Reading Mode | Data-Writing Mode |
| ROM Disk | RFEQ processor, RFAGC block, RF decoder, PLL | RFEQ processor, RFAGC block, RF decoder, PLL, TE(DPD or DPP), RFRP | RFRP generator, RFZC generator, TEZC generator | None |
| Recordable Disk | RFEQ processor, RFAGC block, RF decoder, PLL, wobble signal generator, ADIP/PPIT/ATIP decoder, ADIP/PPIT processor | RFEQ processor, RFAGC block, TE(DPD or DPP) generator, RFRP generator, RF decoder, PLL, wobble signal generator, ADIP/PPIT/ATIP decoder, ADIP/PPIT processor | RFRP generator, RFZC generator, TEZC generator | RFRP generator, RFZC generator, TEZC generator, RFEQ processor, RFAGC block |

The sets of control circuits not being used can be powered down in a specific operation mode for saving the power consumption. For example, the RFEQ processor, RFAGC block, TE (DPD or DPP) generator, RFRP generator, RF decoder, PLL, wobble signal generator, ADIP/PPIT/ATIP decoder and ADIP/PPIT processor can be powered down without effecting the normal operation of an optical recordable drive while the optical recordable drive is in the Long Seek Mode.

Figure 2:
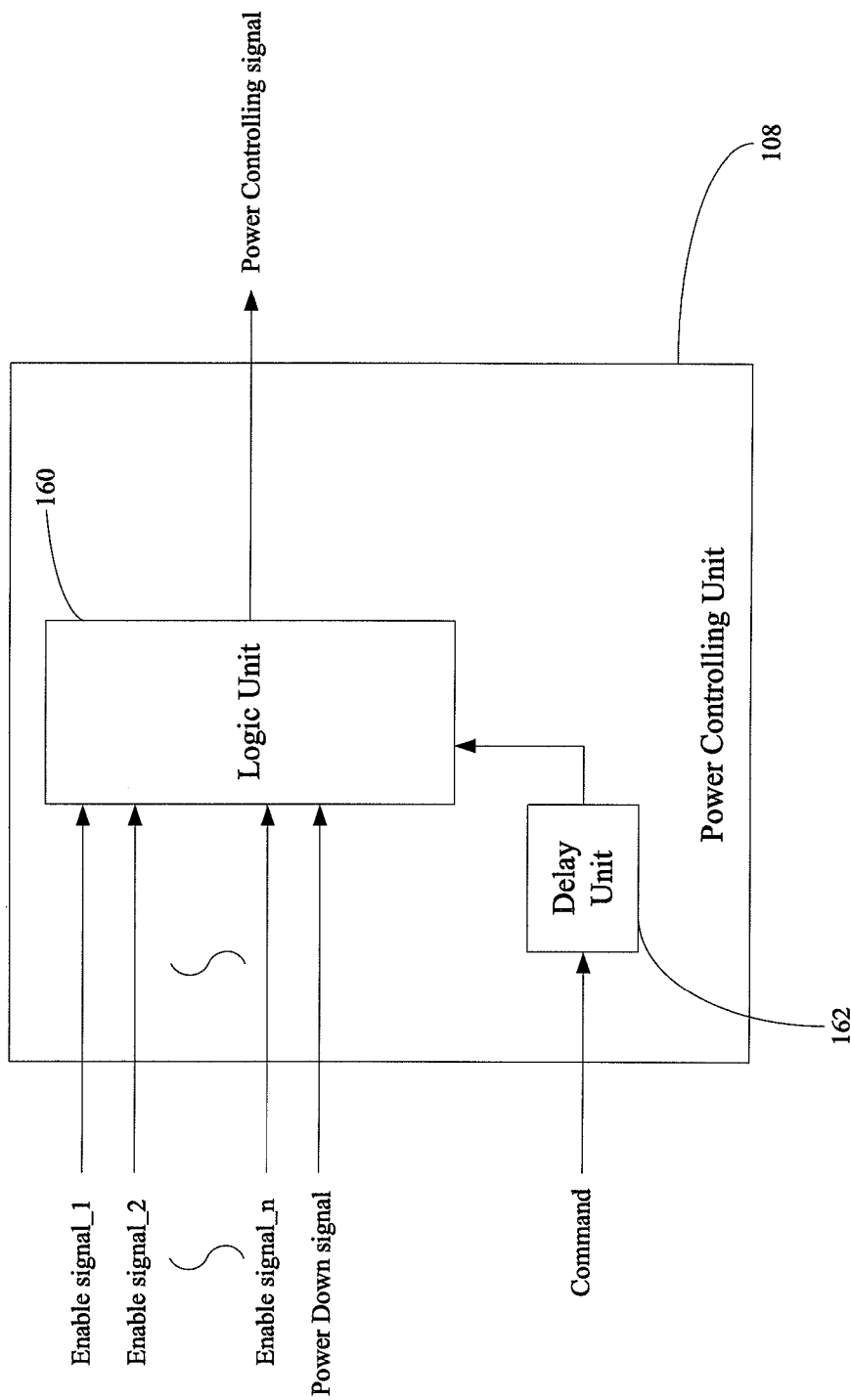
FIG. 2 illustrates a schematic diagram of the power controlling unit.

FIG. 2 shows a schematic diagram of the power controlling unit 108. The power controlling unit 108 is capable of respectively controlling the power states of different sets of control circuits. The power state means that the corresponding set of control circuits is powered up or powered down. The power controlling unit 108 comprises a logic unit 160. The power down logic of the power saving system 10 is designed and set in the logic unit 160 in advance. The logic unit 160 can differentiate the power down signals of different operation modes and output a power controlling signal to power down the sets of control circuits not being used. The power controlling unit 108 may further comprise a delay unit 162 which is used to delay some specific commands inputted into the logic unit 160 for delaying the time of powering down some sets of control circuits. On the other word, the power controlling unit 108 is capable of warming up the circuits should be used in the oncoming operation mode. The delay unit 162 can be controlled by the logic unit 160. Alternatively, the operating mechanism of delay unit 162 can be included in the power down logic of the power saving system 10. The logic unit 160 determines to power down which sets of control circuits not being used according to an oncoming operation mode of the power saving system 10. The logic unit 160 may be realized by a combination of a plurality of logic gates. The logic unit 160 may also be realized by a firmware-based or a software-based structure.

Figure 3:
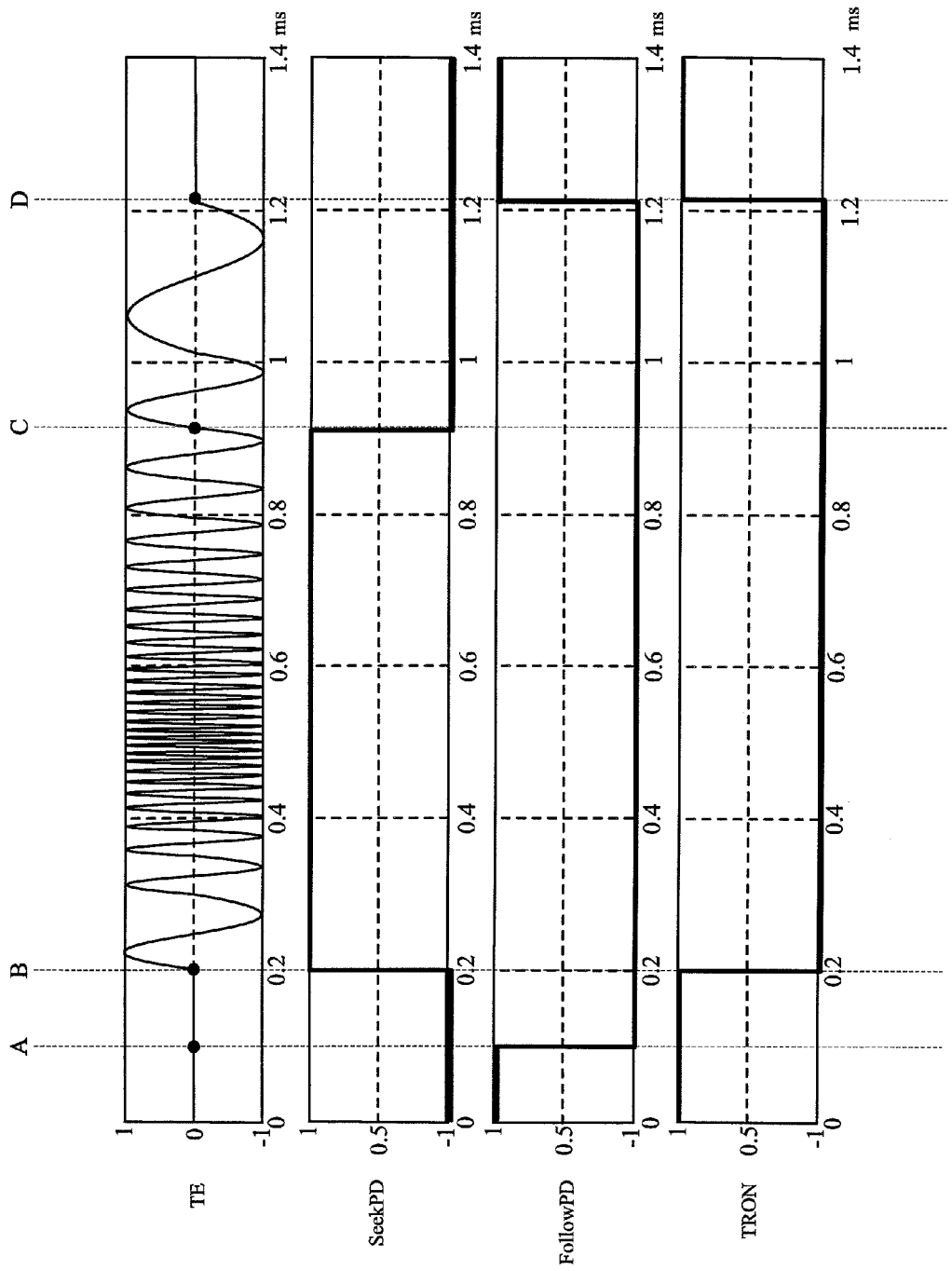
FIG. 3 illustrates an embodiment of the power down signals in different operation modes of the power saving system according to the present invention.
Figure 4A:
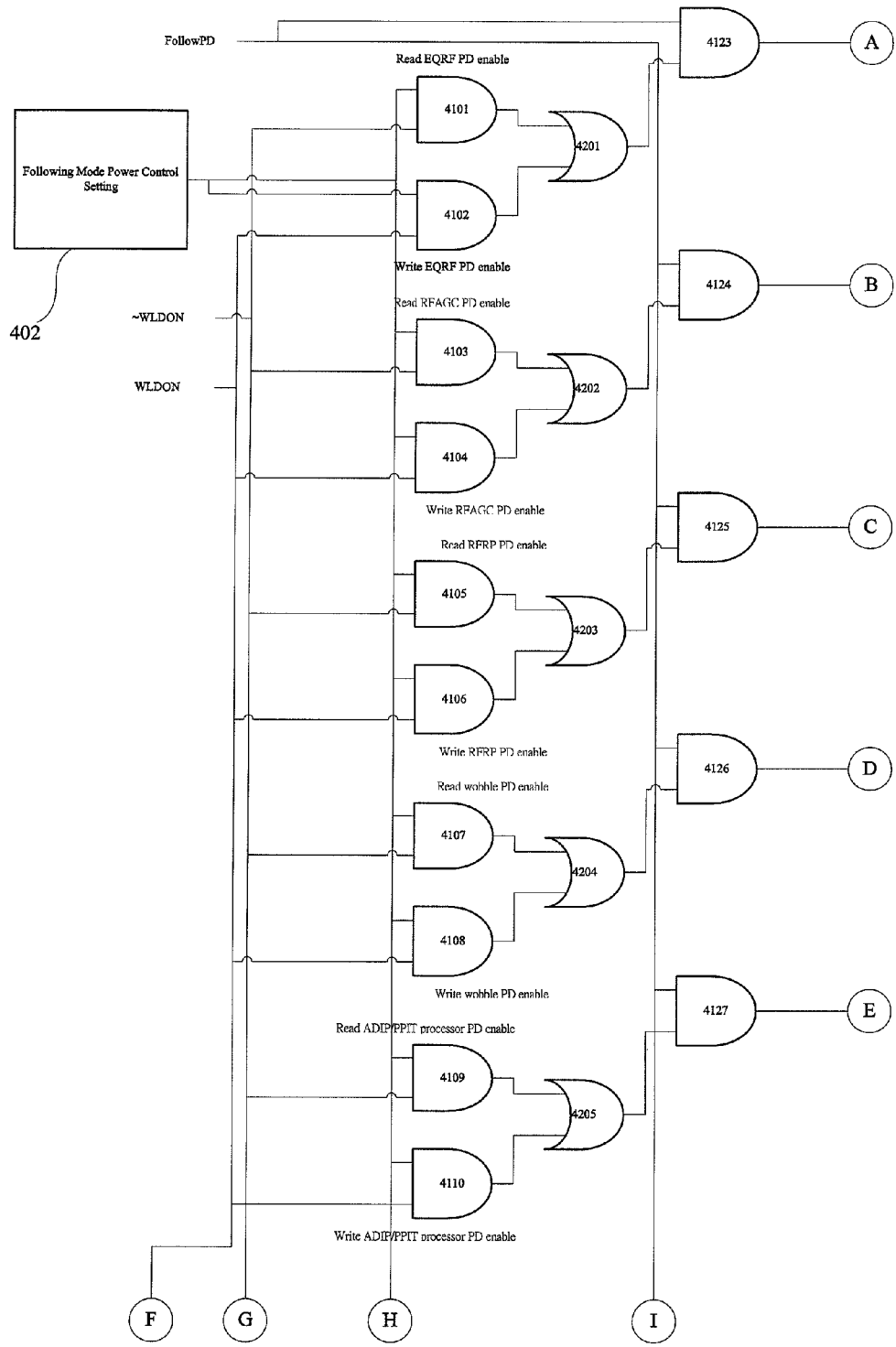
FIGS. 4a-4d show an embodiment of detailed structure of logic unit.
Figure 4B:
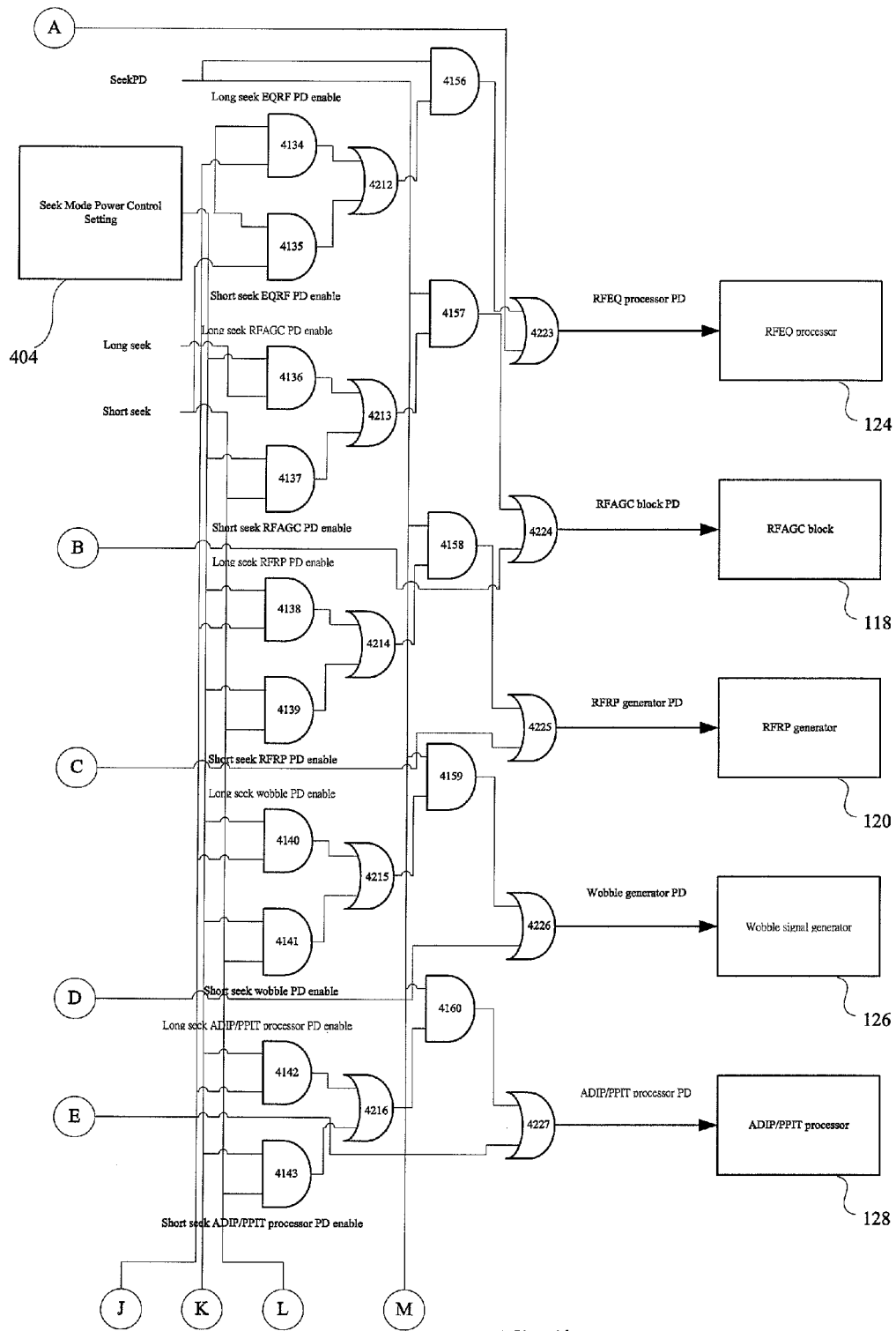
Figure 4C:
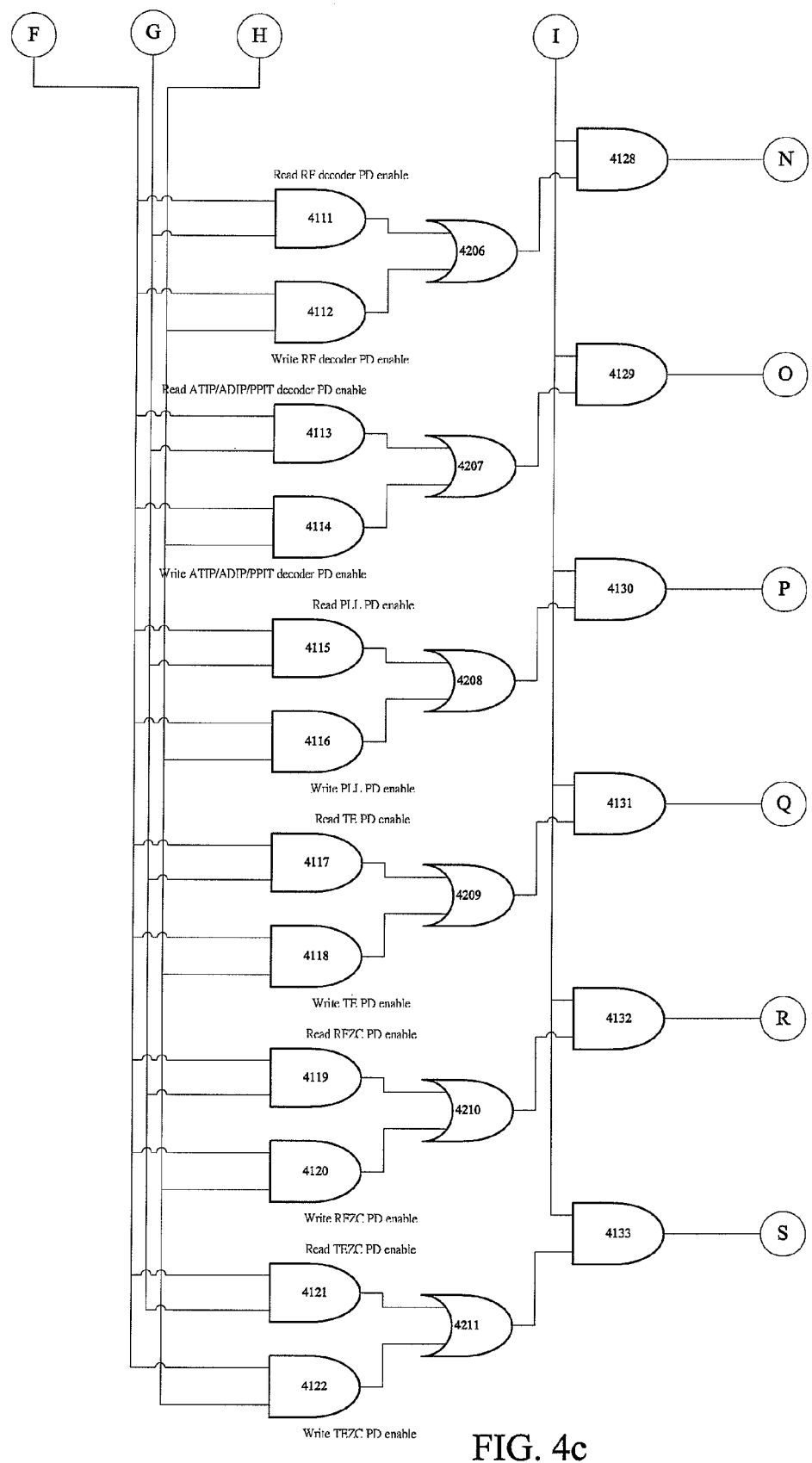
Figure 4D:
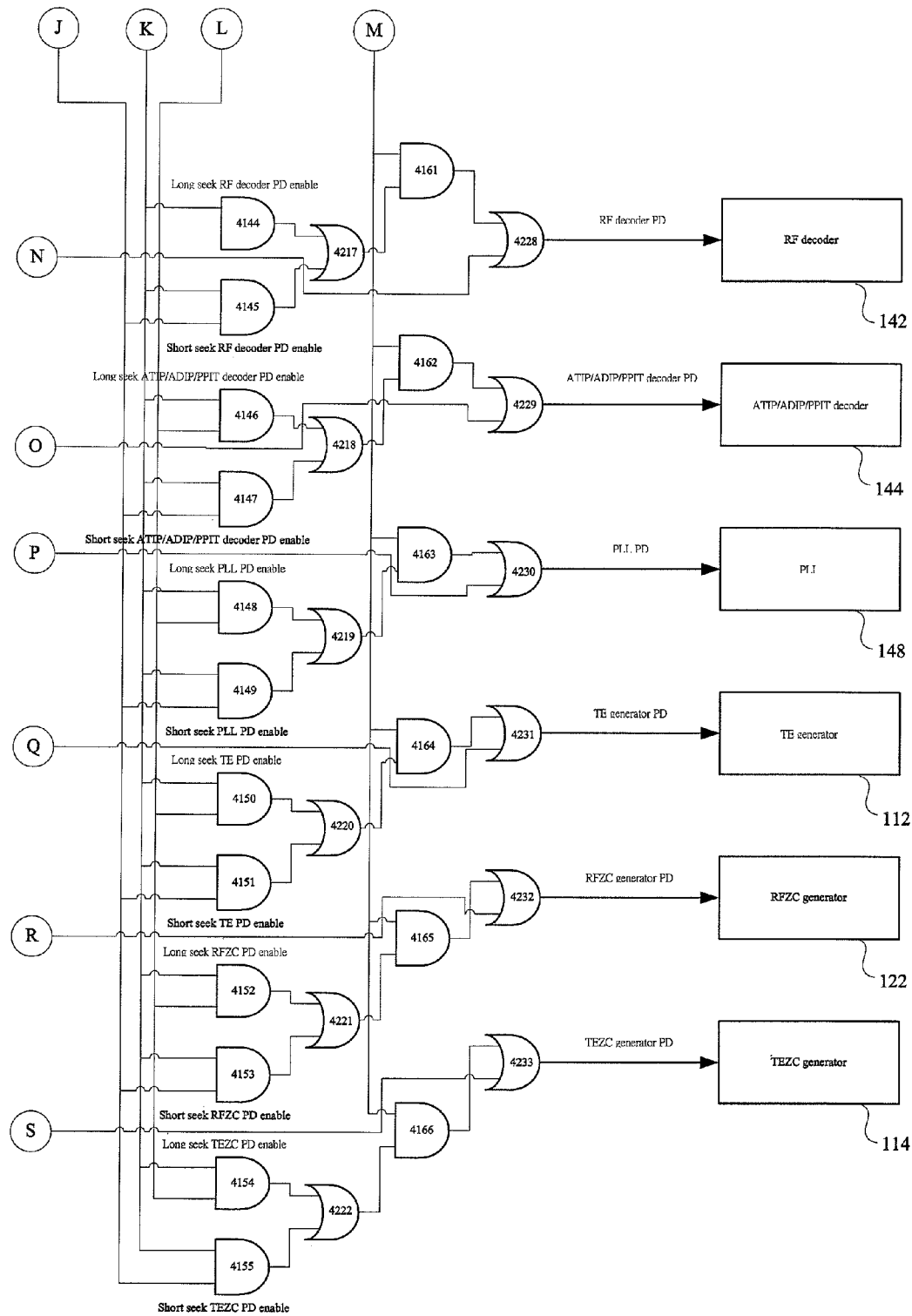

Please refer to FIG. 3. FIG. 3 illustrates the power down signals in different operation modes of the power saving system 10. The high level of Seek PD (seek power down) signal means that the circuits not useful in Seek mode is powered down, contrarily, the low level of Seek PD signal means that the circuits not useful in Seek mode is powered up. Similarly, the high level of Follow PD signal means that the circuits not useful in Following mode is powered down, and the low level of Follow PD signal means that the circuits not useful in Following mode is powered up. During the interval from time point A to B, Follow PD signal pulled low means that the power saving system 10 starts to power up the related sets of control circuits which are not useful in Following mode but is needed in the Seek mode. The Seek mode operation is ready for executing at time point A. At the moment when Seek PD signal is rising, the sets of control circuits not used in the Seek mode will be powered down, such as the related sets of control circuits only used in the Following mode. In the interval from time point B to C, the power saving system 10 enters into the Seek mode at time point B. At the same time, the related sets of control circuits only used in the Following mode will be powered down. Although the Seek mode starts at time B, the related sets of control circuits of Seek mode are powered up at time A in advance under consideration to the inherent warm-up time of the circuits. Similarly, the circuits used in Following mode are powered up again at time C before the Seek mode is finished. The sets of control circuits used in Seek mode will be powered down again at time point D when Follow PD signal is rising, because the Seek mode is finished. In other words, the power saving system 10 enters into the Following mode again at time point D.

It should be noted that the warm-up time of circuit depends on the inherent characteristic of the specific circuit. The specific circuit should be powered up before associated operation mode starts in order to maintain the smooth operation of the optical disk drive. The problem of warm-up time of circuit can be overcome by advancing the powering up a predetermined period of time, such as the time interval from A to B. Alternatively, it can be done by counting the remaining tracks for short seek mode, such as the time interval from C to D. Additionally, the warm-up time of circuit can be achieved by counting the remaining steps for long seek mode.

FIGS. 4a-4d show an embodiment of detailed structure of logic unit 160. The logic unit 160 can be realized by combining a plurality of logic gates for determining which set of circuits should be powered down according to different power controlling signals. The logic gates of logic unit 160 are arranged in accordance with a predetermined power controlling setting, such as Following Mode Power Control Setting 402 and Seek Mode Power Control Setting 404. The predetermined power controlling setting determines the power states of different sets of circuits in the optical disk drive 10 according to different power controlling signals, such as FollowPD, SeekPD signals, different enable signals etc. For example, if FollowPD signal is in logic "1" state and Read RFEQ PD enable is in logic "1" state, AND gate 4101 will output logic "1" signal to OR gate 4201, OR gate 4201 will output logic "1" signal to AND gate 4123, then AND gate 4123 will output logic "1" signal to OR gate 4223. Finally, OR gate 4223 will output a RFEQ processor PD signal to the RFEQ processor 124 for powering down thereof. Accordingly, any set of circuits can be powered down according to different power controlling signals which are preset in the Following Mode Power Control Setting 402 and Seek Mode Power Control Setting 404. It should be noted that this topology of arrangement of logic gates in logic unit 160 is just one embodiment for exemplifying the detailed structure of logic unit 160. The arrangement of logic gates in logic unit 160 also can be realized in another arrangement of logic gates.

Figure 5A:
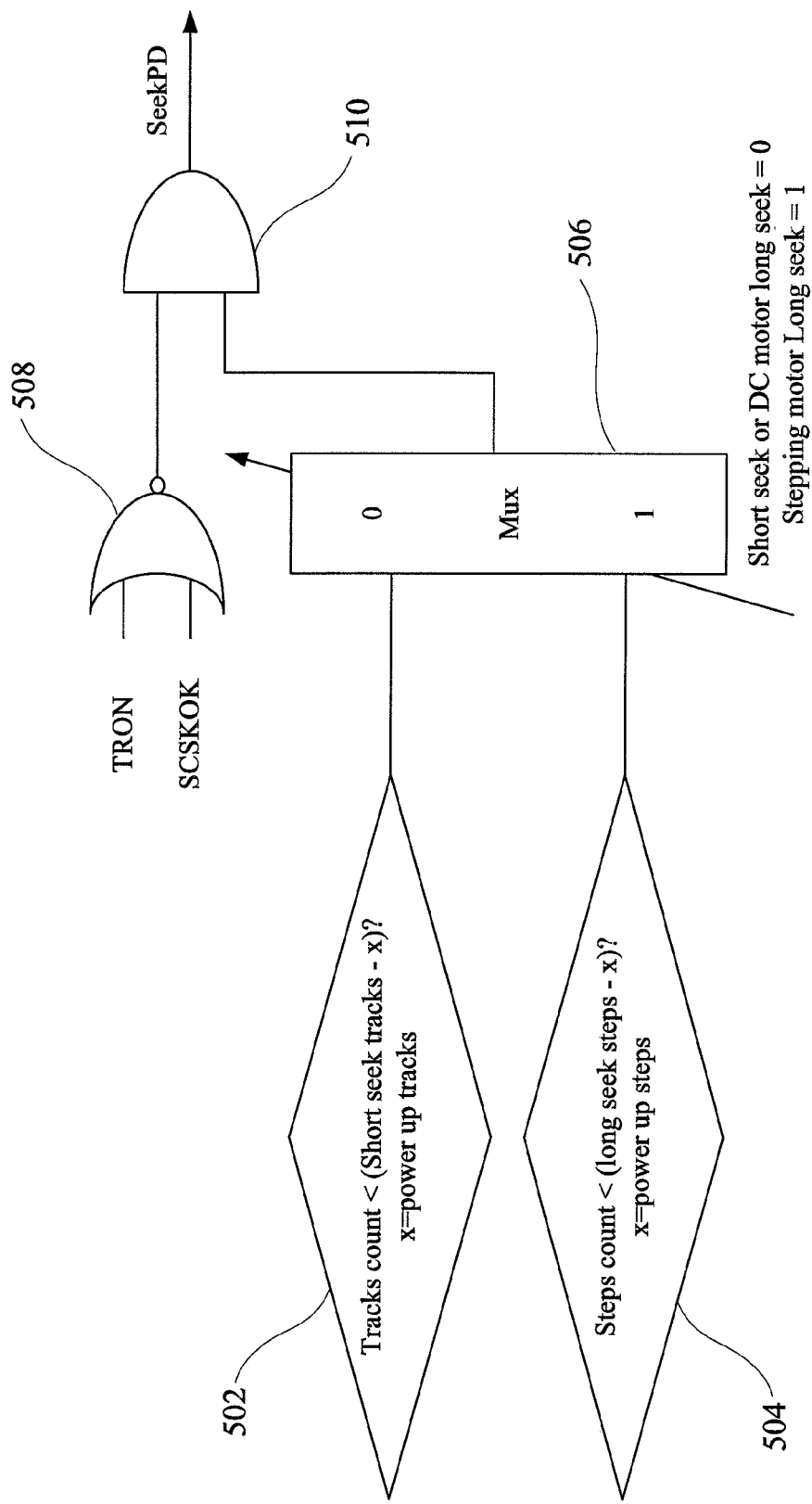
FIGS. 5a and 5b show a structure of determination rule for determining which power controlling signal should be outputted.
Figure 5B:
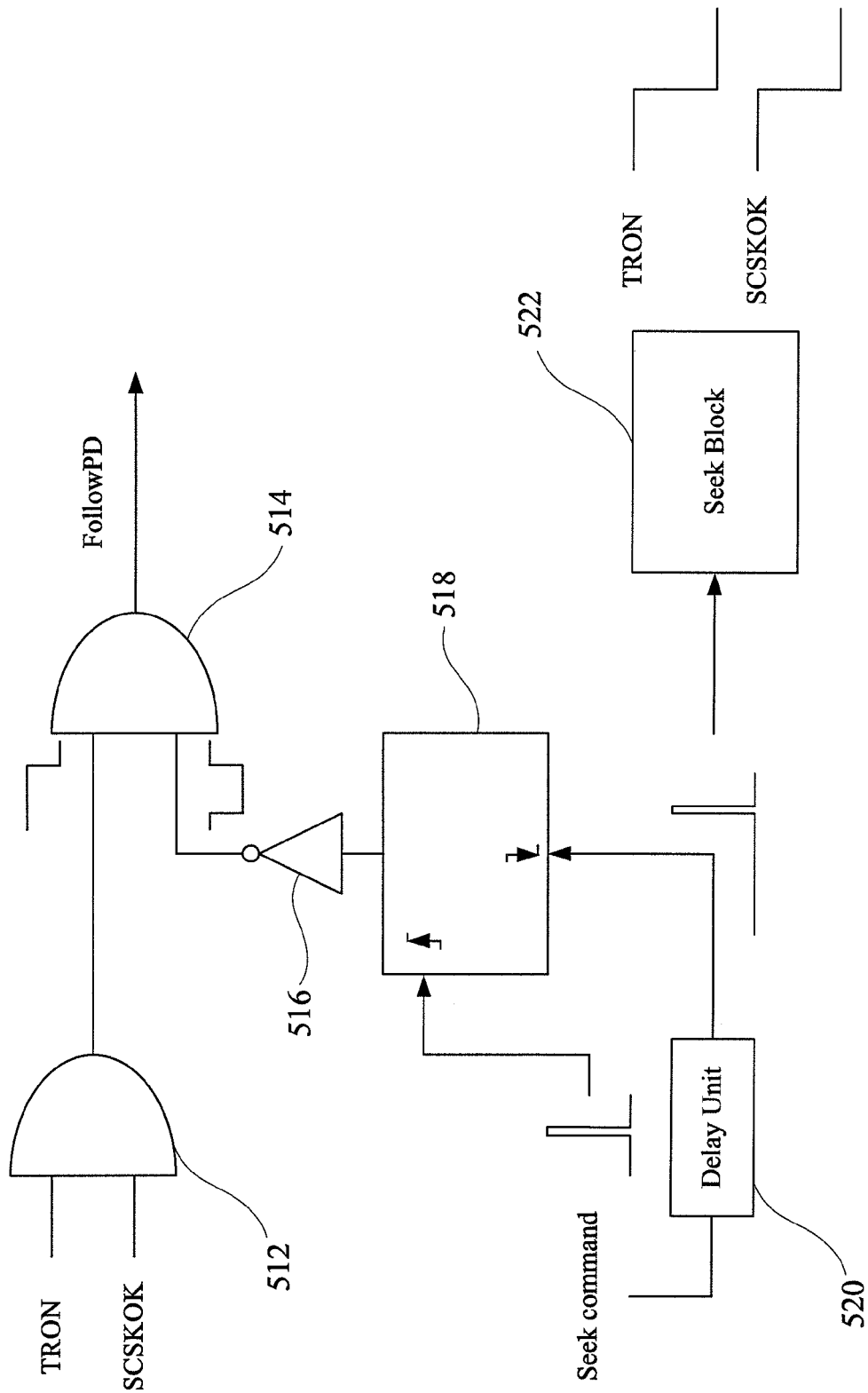

FIGS. 5a-5b show a structure of determination rule for determining which power controlling signal should be outputted. For example, a SeekPD signal can be determined according to the logic states of TRON signal, SCSKOK signal and the number of remaining tracks or remaining steps. Similarly, a FollowPD signal also can be determined according to the logic states of TRON signal, SCSKOK signal and a Seek command. In the embodiment of Seek PD signal, for example, if TRON and SCSKOK signal are all in logic "0" state and Stepping motor Long Seek signal is in logic "1" state, the NOR gate 508 and the multiplexer 506 both output logic "1" signal, then the AND gate 510 will output a SeekPD signal to power down corresponding set of circuits. In the embodiment of Follow PD signal, contrarily, if TRON and SCSKOK signal are all in logic "1" state and Seek command is in logic "0" state, the AND gate 512 and inverter 516 both output logic "1" signal, then the AND gate 514 will output a FollowPD signal to power down corresponding set of circuits. If the Seek command is in the logic "1" state, the High-Low element 518 outputs a logic "1" signal and the inventor 516 outputs a logic "0" signal, then the AND gate 514 outputs a logic "0" state signal. In the meantime, the delay unit 520 delays the Seek command for a predetermined period and then inputs the Seek command to the Seek Block 522 to make the TRON and SCSKOK signal all in logic "0" state. The delay unit 520 also outputs the delay Seek command to the High-Low element 516 to make the High-Low element output a logic "0" state signal to the inverter 516. Then the AND gate 512 outputs a logic "0" signal and the inverter 516 outputs logic "1" signal to make the AND gate 514 output a logic "0" signal. Said delay unit 520 delays the seek command for a predetermined time that could be a warm-up time for seeking circuits. It also should be noted that structure of determination rule of power controlling signal can be realized by other structures which are conformed to the spirit of the present invention.

Figure 6:
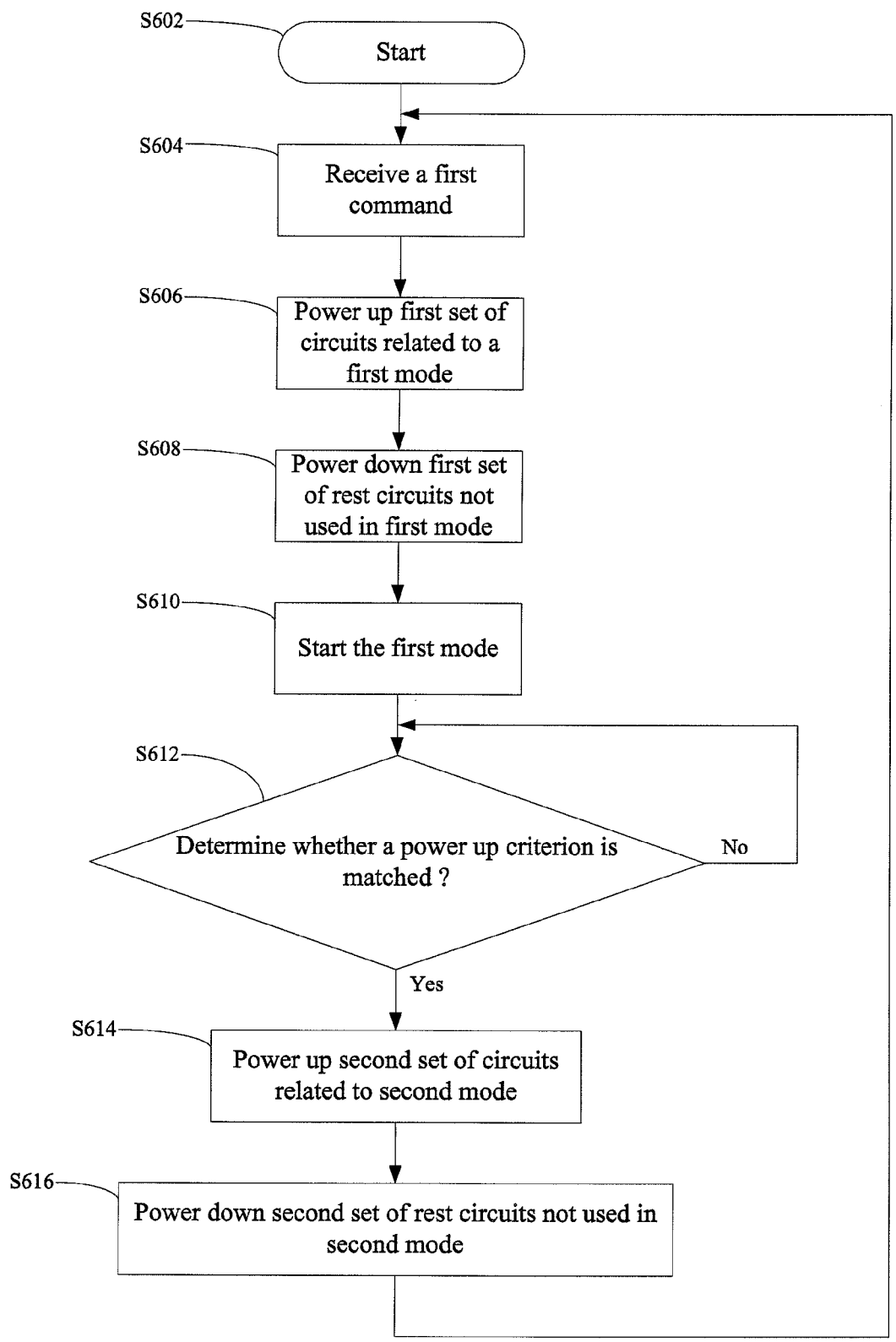
FIG. 6 illustrates a flowchart of a power saving method for controlling the power of related sets of control circuits between two different modes according to the present invention.

FIG. 6 illustrates a flowchart of a power saving method for controlling the power of corresponding circuits between a first and a second modes. The power saving method comprises following steps of:

S602 Starting a power control procedure.

S604 The power controlling unit 108 receives a first operation mode command from the central processing unit 102.

S606 The power controlling unit 108 issues a power up signal to power up a first set of control circuits related to the first operation mode in order to be ready for starting the first operation mode. The first set of control circuits related to the first operation mode are differentiated by the logic unit 160, which is preset by the power controlling unit 108. The logic unit 160 is capable of determining to power down the sets of control circuits not being used in a specific operation mode according to the different commands. Similarly, the logic unit 160 is also capable of determining to power up the sets of control circuits needed in a specific operation mode.

S608 The power controlling unit 108 issues a power down signal to power down the first set of rest control circuits not used in the first operation mode. The first set of rest control circuits not used in the first operation mode are differentiated by the logic unit 160.

S610 The power saving system 10 starts to execute the first operation mode.

S612 The power controlling unit 108 monitors a power up criterion, such as a number of remaining tracks of the optical disk. The power control procedure will go forward to the step S614 if the power up criterion is matched, such as the number of remaining tracks is less than a threshold value, otherwise the power controlling unit 108 continues monitoring the power up criterion.

S614 A second set of control circuits related to a second operation mode are powered up by the power controlling unit 108 in order to be ready for starting the second operation mode.

S616 The second set of rest control circuits not used in the second operation mode are powered down by the power controlling unit 108 when the first mode is finished, and the power control procedure goes backward to step S604.

In step S608, the time point for powering down the first set of rest control circuits not being used in the first operation mode can be determined by delaying a predetermined period from the time point of issuing the power up signal to power up the first set of control circuits related to the first operation mode. Therefore, the first set of rest control circuits not being used in the first operation mode are powered down after the predetermined period ends. In other words, the second operation mode is finished when the predetermined period ends. The predetermined period can be predetermined according to the length of warm-up time of first set of control circuits related to the first mode. Alternatively, the time point for powering down the first set of rest control circuits not being used in the first operation mode also can be determined when the power controlling unit 108 receives a signal for indicating that the first operation mode is started.

The power up criterion is predetermined according to the characteristic of different operation modes. For example, the power up criterion can be realized by counting the remaining tracks when a Seek mode is interchanges with a Following mode. The power up criterion is used to power up the next set of control circuits related to the next operation mode in advance due to the warm-up time of related circuits of corresponding operation mode. Further, for another example, the power up criterion can be realized by counting the remaining steps for a step motor of a pick-up head. The remaining steps means how far the pick up head can reach the target position and the operation mode would be changed in the target position. Suppose that the warm-up time of specific set of control circuits is 0.2 ms (minisecond) and a step update rate of step motor is 500 Hz, it means that the specific set of control circuits should be warmed up before last remaining step is transmitted. It should be noted that the power up criterion can be varied according to different characteristic of operation modes.

Consequently, the present invention provides the power saving system and the power saving method applied in an optical disk drive. The power saving system and method of the present invention are adapted for powering down the sets of control circuits not being used during a specific operation mode of the optical disk drive without effecting the normal operation of the optical disk drive. Therefore, the power saving system and the power saving method according to the present invention are capable of efficiently reducing the power consumption of the optical disk drive.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A power saving method of an optical disk drive, comprising steps of:
   preparing to control the optical disk drive operated in a seek mode;
   powering up a first set of circuits related to the seek mode;
   determining a predetermined period according to a length of warm-up time of the first set of circuits;
   powering down a first set of rest circuits, which are useless in the seek mode, after the predetermined period ends;
   starting the seek mode;
   powering up a second set of circuits for a following mode different to the seek mode before the seek mode is finished; and
   powering down the first set of circuits once the seek mode is finished and at this moment starting the following mode.

2. The power saving method of claim 1, wherein the length of warm-up time of the first set of circuits is whether a number of remaining tracks is less than a threshold value.

3. The power saving method of claim 1, wherein the length of warm-up time of the first set of circuits is whether a number of remaining segments of a signal transmitted by a processing unit is less than a threshold value.

* * * * *